United States Patent [19]

Billiet et al.

[11] Patent Number: 5,225,073
[45] Date of Patent: Jul. 6, 1993

[54] APPARATUS FOR SEPARATING CONTAMINANT FROM WATER

[75] Inventors: Colin T. Billiet, Durham; Robert M. Fielding, Blyth, both of England

[73] Assignee: Domnick Hunter Limited, Birtley, England

[21] Appl. No.: 908,666

[22] Filed: Jul. 2, 1992

[30] Foreign Application Priority Data

Jul. 6, 1991 [GB] United Kingdom ............... 9114628

[51] Int. Cl.⁵ ............................................. B10D 24/14
[52] U.S. Cl. .................................. 210/121; 210/188; 210/265; 210/266; 210/124; 210/DIG. 5; 210/260; 210/262
[58] Field of Search ......... 210/188, 539, 540, DIG. 5, 210/266, 265, 121, 124, 259, 260, 261, 262, DIG. 8, 799

[56] References Cited

U.S. PATENT DOCUMENTS

| | | | |
|---|---|---|---|
| 2,713,919 | 7/1955 | Walker et al. | 210/261 |
| 3,558,482 | 1/1971 | De Young | 210/266 |
| 3,965,004 | 6/1976 | Garber | 210/DIG. 5 |
| 3,992,297 | 11/1976 | Baughcom et al. | 210/188 |
| 4,011,158 | 3/1977 | Cook | 210/DIG. 5 |
| 4,116,835 | 9/1978 | Bertelson | 210/DIG. 5 |
| 4,139,463 | 2/1979 | Murphy et al. | 210/259 |
| 4,145,280 | 8/1979 | Middlebeck et al. | 210/265 |
| 4,265,759 | 5/1981 | Verpalen et al. | 210/261 |
| 4,308,136 | 12/1981 | Warne, Jr. | 210/265 |
| 4,361,488 | 11/1982 | White et al. | 210/DIG. 5 |
| 4,426,293 | 1/1984 | Mason et al. | 210/636 |
| 4,565,629 | 1/1986 | Wilson et al. | 210/DIG. 5 |
| 4,859,329 | 8/1989 | Fink | 210/257.1 |
| 5,120,435 | 6/1992 | Fink | 210/192 |

FOREIGN PATENT DOCUMENTS 1158929 7/1969 United Kingdom.
2084480 4/1982 United Kingdom.

Primary Examiner—Stanley S. Silverman
Assistant Examiner—Cynthia L. Nessler
Attorney, Agent, or Firm—Darby & Darby

[57] ABSTRACT

Apparatus for separating contaminant from water, the contaminant being of lower density than water. The apparatus comprises a settlement chamber, initial separating means, and an entry port for introducing the liquid to be separated into the initial separating means for flow therethrough into the settlement chamber. A contaminant outlet opens from an upper region of the settlement chamber. A pump intake is located towards the lowermost part of the settlement chamber, and feeds a pump. The outlet from the pump is directed to a molecular separation filter capable of separating water from contaminant. Water discharges from the molecular separation filter, and can be further treated by an optional activated carbon filter. Contaminant leaving the molecular separation filter is directed back into the initial separating means.

9 Claims, 3 Drawing Sheets

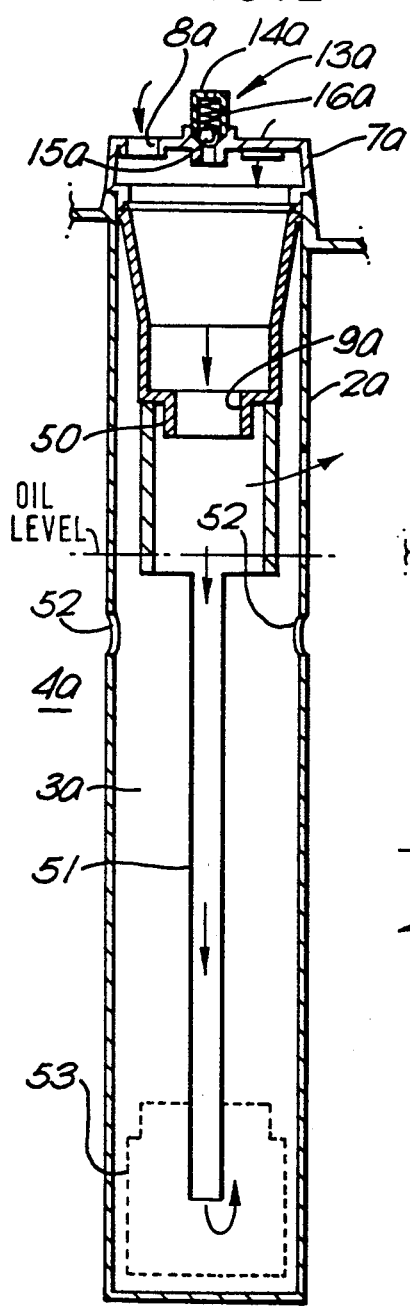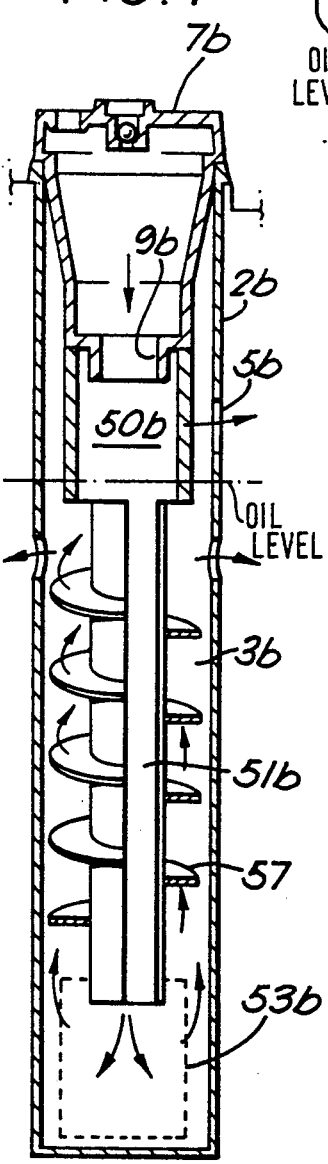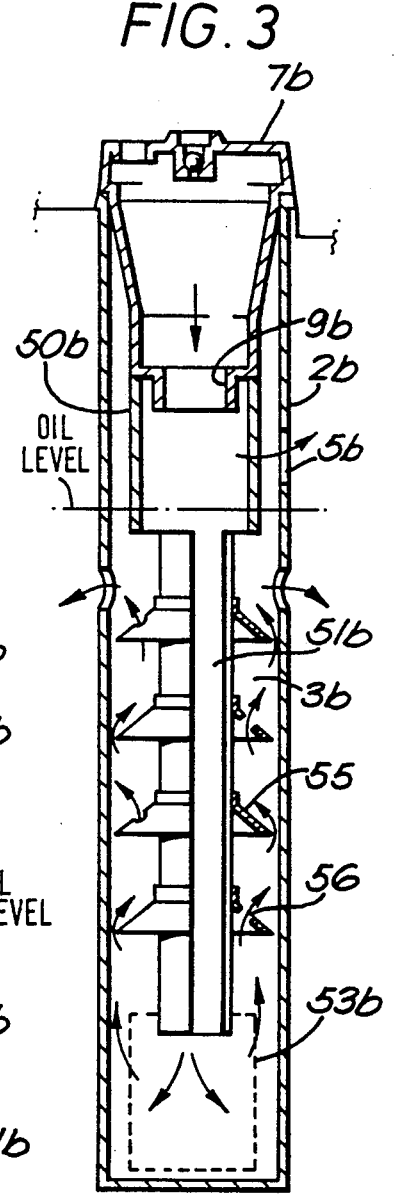

APPARATUS FOR SEPARATING CONTAMINANT FROM WATER

This invention relates to apparatus for separating contaminant from water, the contaminant being lower in density than water. Oil/water separators are known which rely on settlement of the mixture to allow oil to be drawn off at a higher level than water, but these have limited efficiency as they are unable effectively to separate the oil/water emulsion which is also present in these mixtures. Separation is significantly more difficult when dealing with stable emulsions, such as emulsions containing lubricating oils or cutting fluids such as polyglycols. Some separation of these emulsions can be achieved using molecular separation filters, but existing systems are prone to blocking and need frequent maintenance. Separation also causes problems where the contaminant has some solubility in water.

It is becoming increasingly important to separate contaminants from water before discharging the water to the sewage system, in order to reduce pollution levels. If effective separation can be carried out by a simple, on-site apparatus then the site operators need for specialised waste collection can be significantly reduced.

According to the invention apparatus for separating contaminant from water, the contaminant being of lower density than water, comprises a settlement chamber, initial separating means, an entry port for introducing the liquid to be separated into the initial separating means for flow therethrough into the settlement chamber, a contaminant outlet opening from an upper region of the settlement chamber, a pump, a pump intake located towards the lowermost part of the settlement chamber, a molecular separation filter connected to an outlet from the pump and capable of separating water from contaminant, a water outlet from the molecular separation filter, and a contaminant outlet from the molecular separation filter leading into the initial separating means.

In operation, the liquid to be separated enters the device and passes through the initial separating means. This is effective to cause some initial separation of water/contaminant emulsion, so forming free contaminant droplets which float on the surface of the liquid that passes into the settlement chamber. Further free contaminant rises to the surface of this liquid within the settlement chamber, and this surface contaminant flows from the chamber through the contaminant outlet. When the pump is running, liquid is taken from the lowermost part of the settlement chamber, where contaminant concentration is least, and passes to the molecular separation filter. That filter effects separation of water and contaminant, whether the contaminant be in emulsion or solution, and the water can be discharged from the apparatus. The contaminant is directed back through the initial separating means to re-enter the settlement chamber. It will be seen that the concentration of contaminant in the settlement chamber gradually increases and this causes contaminant to be released from the emulsion and/or solution at an increasing rate. That contaminant rises to the top of the settlement chamber and flows through the outlet therefrom.

The settlement action and the location of the pump intake ensure that it is always the least contaminated liquid that is handled by the molecular separation filter, which is therefore very much less prone to blockage and requires significantly less maintenance than has hitherto been the case.

The pump is desirably controlled so that operation is stopped should the contaminant concentration in the lowermost part of the settlement chamber become too high. That control could be manual in response to appropriate sensors or, preferably, is automatic. Automatic control may be in response to periodic sample analysis, but it has been found that effective control can be achieved by simply responding to the level of liquid in the settlement chamber. Accordingly, therefore, the pump is preferably controlled by a float switch including a float supported by liquid taken from substantially the same level within the settlement chamber as the pump intake, the float switch operating to switch on the pump at a first float level and to switch off the pump at a second float level below the first level.

The apparatus conveniently includes alarm means operable by the float switch should the float reach a third level above the first level. Such a rise will indicate either pump failure or a fault with the molecular separation filter, and the alarm can be either audible or visual or both to give a warning so that the necessary remedial action may be taken.

The molecular separation filter can take many different forms, but it is preferably a cross-flow membrane filter. Such filters are now widely used in ultrafiltration and microfiltration systems and comprise membrane which may be in the form, for example, of hollow fiber, hollow tube, flat plate or spirally wrapped sheet, such membranes are thin polymeric films, generally having an asymmetric pore structure. Water can permeate through the pore structure, while the higher molecular weight contaminant is retained to flow within the interior of the membrane.

The water permeating from the membrane may in some applications be sufficiently pure for it to be discharged direct to the sewage system. However, if additional treatment is required then the water outlet from the separation filter may be directed to a sorbent bed through which the water flows before being discharged from the apparatus. The sorbent bed may be of any suitable material that will effect the required action. The preferred material will usually be activated carbon, but materials such as activated alumina, zeolite or hydrophobic polyurethane foam may be used. It has been found that the level of contaminant remaining in waste water leaving the apparatus can be less than 5mg/l, a level that is significantly lower than previously achieved.

In one embodiment of the invention the initial separating means comprises a coalescing filter, which is effective to allow any air or other gas to escape from the feed material, and which will coalesce some contaminant from the emulsion.

In another embodiment of the invention the initial separating means comprises a gas release region, a separation chamber having an outlet only in an upper part thereof, said outlet opening into the settlement chamber, and an impermeable liquid feed tube extending from the interior of the gas release region to open into the lower part of the separation chamber, said contaminant outlet from the settlement chamber lying above the level of the outlet from the separation chamber and below the level of the gas release region.

In order that the invention may be better understood, specific embodiments of apparatus in accordance therewith will now be described in more detail, by way of example only, with reference to the accompanying drawings in which:

BRIEF DESCRIPTION OF THE DRAWINGS

FIGS. 2 to 5 each show a different embodiment of part of the apparatus of FIG. 1.

Figure 1:
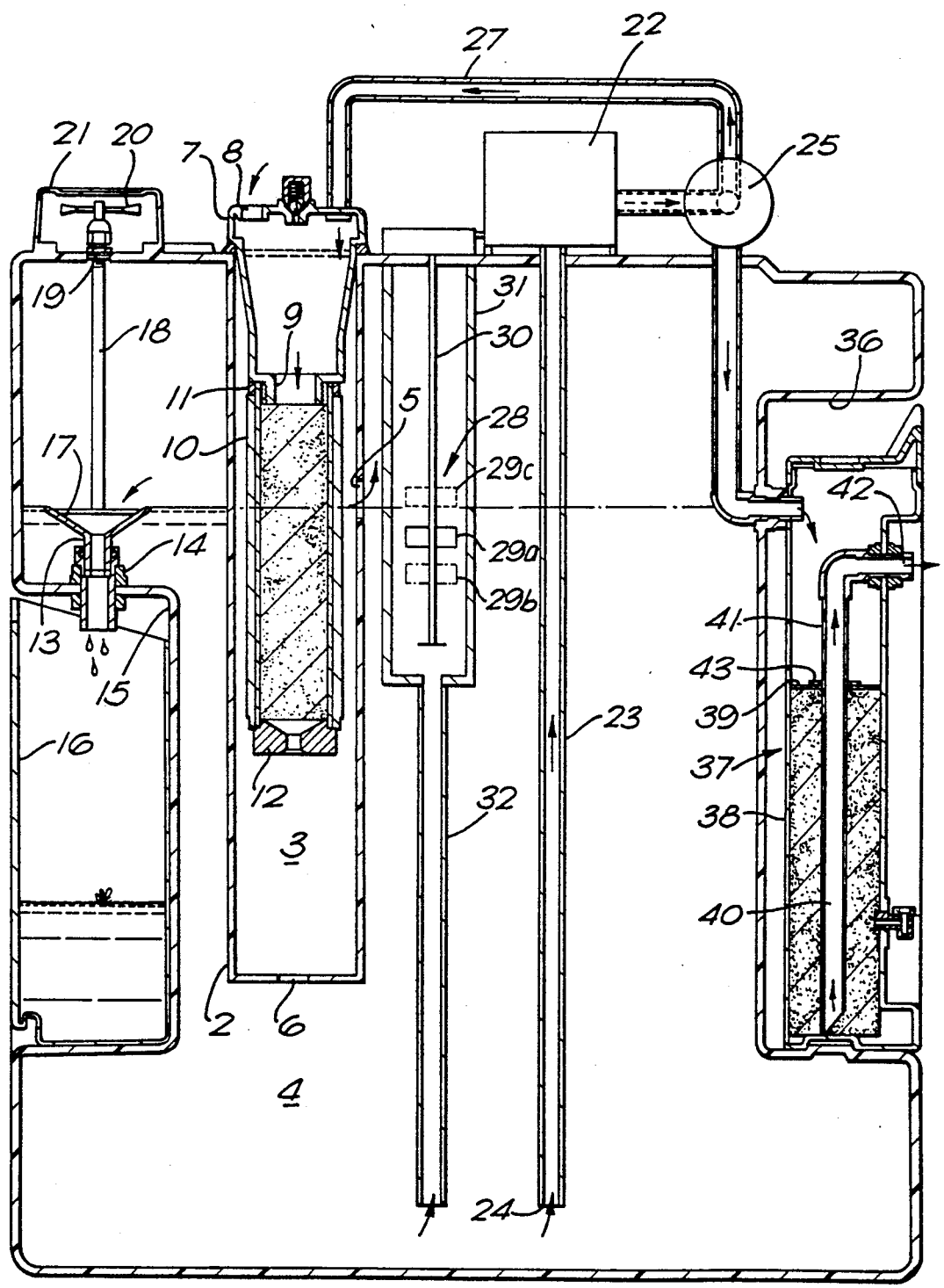
FIG. 1 is a schematic view of a first embodiment of apparatus according to the invention.

The apparatus shown in FIG. 1 comprises a container 1, which may desirably be seamless and formed, for example, by rotational moulding of a suitable plastics material. The container is divided by an inserted cylindrical partition 2 into a chamber 3 lying within the partition and a chamber 4 lying outside the partition and forming a settlement chamber. Chamber 3 communicates with chamber 4 by way of a slot 5 cut in the wall of the partition 2 and a hole 6 in the bottom of that partition. The top of the vessel is fitted with an inlet manifold 7 which includes entry ports 8 for introducing the emulsion to be separated.

An exit port 9 from the inlet manifold opens into the interior of a coalescing filter 10 mounted in the chamber 3 with its axis extending vertically within that chamber. An upper end cap 11 of the coalescing filter is detachably secured to the inlet manifold in order to support the filter within chamber 3. The coalescing filter is located so that part thereof, desirably about one third of its length, is located above the level that will be the contaminant outlet level when the apparatus is in use.

The coalescing filter itself may be of conventional construction, for example as described in GB-B-2128497 or GB-A-2198739. Thus, the filter comprises an upper end cap 11 and a lower end cap 12 between which extend inner and outer perforated metal cylinders, between which is sandwiched a cylinder of filter medium. The particular filter medium that is presently preferred is non-woven polypropylene fiber, compressed to a density to give the required filtering action. Other coalescing filter media could equally well be used, for example borosilicate glass microfibre. The outer metal cylinder may be circumferentially surrounded by an anti-re-entrainment barrier, for example a sleeve of polyvinyl chloride coated foam or of non-woven polyester material.

A contaminant outlet pipe 13 is located within the settlement chamber 4 and extends downwardly through a sliding seal secured by a bulkhead fitting 14 in a re-entrant section 15 of the vessel wall. The pipe 13 can drain into a contaminant collection tank 16, desirably of a translucent plastics material, supported in the re-entrant section. A funnel 17 is secured to the upper end of the outlet pipe 13 and a support bar extends across the open top of the funnel. A support rod 18 extends upwardly from the support bar through a locking gland 19 in the upper wall of the vessel. A "T" bar 20 is secured to the upper end of the support rod 18 and protected by a removable cap 21. The height of the funnel may be adjusted by removing the cap 21, unlocking the gland 20, grasping the "T" bar to manually move the rod 18 and then re-locking the gland 19.

A pump 22 is mounted externally of the container and has an intake 23 with an opening 24 located close to the lowermost part of the settlement chamber 4. The pump outlet is connected to a cross-flow membrane filter 25 removably mounted on the upper part of the container. Permeate leaves the membrane filter through line 26, while concentrate leaves the filter through line 27 which is connected back to a further entry port of the inlet manifold 7.

The cross-flow membrane filter may be of any suitable form and of a molecular weight cutoff appropriate to the environment in which the apparatus is to be used. The membrane may be a nylon membrane having an asymmetric pore structure comprising a thin porous skin covering a more highly porous substructure. The membrane may be unsupported or may be supported on any suitable porous substrate. Such ultrafiltration membranes have a low resistance to permeate flow, permitting low-pressure operation. The contaminated water flows across the skin side of the membrane and the water molecules permeate through the small pore openings in that skin. Oil and other contaminants, and suspended solids, are larger than the pore openings and the contaminant is thus concentrated as it flows through the filter. Purity of the water permeate is directly related to the molecular weight cutoff of the membrane, the permeate being more pure from a membrane having a low cutoff. Cutoffs of from 3000 to 20,000 may typically be used.

The pump is controlled by a float switch shown generally as 28. The switch includes a float member 29 having a density between that of water and the separated contaminant and guided on a vertical guide rod 30 depending from the top of a further chamber 31 defined within the settlement chamber. A tube 32 leads from the lower end of chamber 31 and opens into the settlement chamber at substantially the same level as the pump intake. The chamber 31 thus fills with liquid of substantially the same contamination level as the liquid that is supplied to the pump. When the float is in position 29a (supported by the water but below the contaminant level) the pump is switched on. If the float drops to position 29b then the pump is switched off. Should the float rise to position 29c this indicates too high a liquid level within the container, indicating either pump failure or failure of the molecular separation filter. In this position, the float may effect switching of an appropriate electrical circuit (not shown) in order to give a visual or audible alarm, or a combination of these two alarms.

The container I has a second re-entrant section 36 in which an activated carbon filter 37 is supported. The activated carbon filter comprises a housing 38 packed with activated carbon between perforated end plates 39, 40 and mounted with its axis substantially vertical. The water outlet from the molecular separation filter enters the housing 38 above the activated carbon. A discharge pipe 41 extends upwardly through the sorbent bed from the bottom thereof to a clean water outlet level 42 lying above the upper part of the bed but below the water entry level from the separation filter. This arrangement ensures a constant level of water above the sorbent bed, so that if there should be any residual traces of contaminant from the cross-flow filter this will float within the housing in which the sorbent bed if contained and will not contaminate that bed. The bed may be maintained in a compressed state by securing the end plate 39 by a locking washer 43 secured on the outside of the discharge pipe.

Operation of the apparatus will readily be understood. The apparatus is initially primed with clean water until steady state flow from the water outlet is attained, the float being at level 29a and the pump operating. Thereafter, liquid to be separated is allowed to enter the apparatus through the inlet manifold 7 and passes into the coalescing filter 10. Any air that is with the liquid escapes through the dry upper section of the filter above the liquid level within the settlement chamber 4, and that section of the filter acts to remove airborne aerosol and also has a silencing effect on the escaping air. The coalescing filter also separates some bulk contaminant from the liquid and this, together with air, pass through the slot 5. The remaining liquid flows through the hole 6 into the settlement chamber. Within that chamber some separation occurs as the contaminant gradually comes out of the emulsion and/or solution. There is thus a gradient within that chamber of lowest contamination at the bottom of the chamber to highest contamination at the top thereof. Liquid is pumped from the bottom of the settlement chamber by the pump and passes through the cross-flow filter 25, from where water permeate is taken by line 26 to the activated carbon filter. The concentrated contaminant passes through line 27 back to the inlet manifold and then back through the coalescing filter into the settlement chamber.

The flow of incoming liquid is controlled so that the intake flow rate is less than the total discharge flow rate and accordingly, because of the feedback of contaminant through line 27, the concentration of contaminant within the settlement chamber increases. As a result of this, more of the contaminant is released from the emulsion and/or solution and rises to the top of the settlement chamber. Also as a result of this, the level of liquid in the settlement chamber gradually falls and the float accordingly moves to position 29b where the pump is switched off. The continuing inflow of liquid then causes the level to rise so that the float again returns to position 29a whereupon the pump is switched on to resume flow through the cross-flow filter. This control of the pump ensures that the cross-flow filter is never supplied with liquid having too high a contaminant concentration, and accordingly it can operate extremely efficiently and with very little maintenance.

Referring now to FIG. 2, this shows a modified arrangement of initial separating means, parts corresponding to parts shown in FIG. 1 having the same reference numeral with the suffix a. In this embodiment the exit port 9a from the inlet manifold 7a opens into the interior of a gas release region having a gas permeable wall 50 mounted in the first chamber 3a with its axis extending vertically within that chamber. The upper end of the wall 50 is secured to the inlet manifold. The gas release region is located wholly above the level that will be the steady state oil level when the apparatus is in use. An impervious liquid feed tube 51 extends downwardly from the lower end of wall 50 to the lower part of the separation chamber 3a.

The wall 2a defining the chamber 3a communicates with the settlement chamber 4a by way of openings 52 cut in an upper part of the wall 2a, and by way of opening 5a above the openings 52 and above the intended steady state oil level.

The wall 50 of the gas release region is desirably designed to impose a very low pressure drop on gas passing therethrough to ensure a steady gas flow that will not disturb liquid settling in the apparatus and to ensure that no gas is forced down the liquid feed tube 51. The wall 50 may, for example, simply be a length of open weave fabric wound around a perforated metal cylinder, or may be any suitable form of coalescing filter.

In this embodiment the inlet manifold 7a may optionally incorporate a visually indicating pressure relief valve 13a comprising a clear plastic housing 14a within which a ball valve 15a is urged onto a seat by a compression spring 16a.

Operation of the apparatus is similar to that described with reference to FIG. 1. An air/oil/water mixture discharged, for example, from a compressor aftercooler or a compressed air ring main, enters the system through the inlet manifold 7a and passes into the gas release region. Any air that is with the liquid escapes through the wall 50 of this region and the opening 5a to enter the settlement chamber above the liquid level therein. The air is released to atmosphere through an opening (not shown) in the top of the container 1. The wall 50 may also act to remove some airborne aerosol and to have a silencing effect on the escaping air. The liquid mixture passes from the gas release region down feed tube 51 into separation chamber 3a, wherein the oil begins to separate from the water. The liquid rises through the chamber 3a and emerges into the settlement chamber 4a through the openings 52. Within the settlement chamber 4a the liquids continue separating, contaminant is discharged and the membrane filter and activated carbon filter function as already described. It has been found that this arrangement can be superior to the FIG. I embodiment, in that more effective initial separation of contaminant from the emulsion can be effected, so prolonging the lives of the membrane filter and the activated carbon filter.

In a modified form of the apparatus in FIG. 2 the lower end of the liquid feed tube 51 may open into the interior of a coalescing filter 53 as indicated in broken lines in FIG. 2. The filter 53 may be a conventional coalescing filter, for example of a construction similar to that described in GB-B-2128497 or GB-A-2198739. Such filters comprise an upper end cap and a lower end cap between which extend inner and outer perforated metal cylinders. A cylinder of filter medium is sandwiched between the metal cylinders, the filter medium being, for example, non-woven polypropylene fiber or boro-silicate glass microfibre. Alternatively, filter 53 could simply be a body of plastics foam or other open material providing a high internal surface area onto which oil droplets may coalesce. Foam is the presently preferred medium as in addition to providing the required surface area it also does not impose any significant pressure drop to the liquid flowing therethrough.

A filter in the position 53 will in due course commence to become blocked and will accordingly impose an increasing back pressure on the liquid flowing through tube 51. If the optional valve 13a is incorporated in the inlet manifold then a visual indication will be given of this increasing pressure, by lifting of the ball valve 15a and the filter 53 can thereafter be replaced.

FIGS. 3 and 4 show alternative arrangements for the separation chamber 3a of FIG. 2, and parts corresponding to those in FIG. 1 are indicated by the same reference numerals with the suffix b. In the embodiment of FIG. 3 the liquid feed tube 51 supports a series of baffles or vanes 55, the edges of which may be located closely to the internal surface of the housing 2b. The baffles 55 may also be formed with openings such as 56 through which the liquid may pass. The baffles are desirably of fiberglass or a suitable plastics material such as polypropylene. The presence of the baffles will aid removal of suspended oil droplets due to impaction and surface tension effects. These droplets will attach temporarily to the surfaces of the baffles and will then float upwardly through the tortuous path defined by the baffles to the upper section of the separation chamber 3a.

In the embodiment of FIG. 4 the liquid feed tube 51 supports a spiral baffle 57, which again may be formed of fiberglass or a suitable plastics material, and which will again assist in separating the oil and water phases. In each of the FIG. 3 and 4 embodiments the lower end of the liquid feed tube 52 may open into an optional coalescing filter 53b. Baffle arrangements other than those of FIGS. 3 and 4 can be incorporated in the separation chamber 3b.

Figure 5:
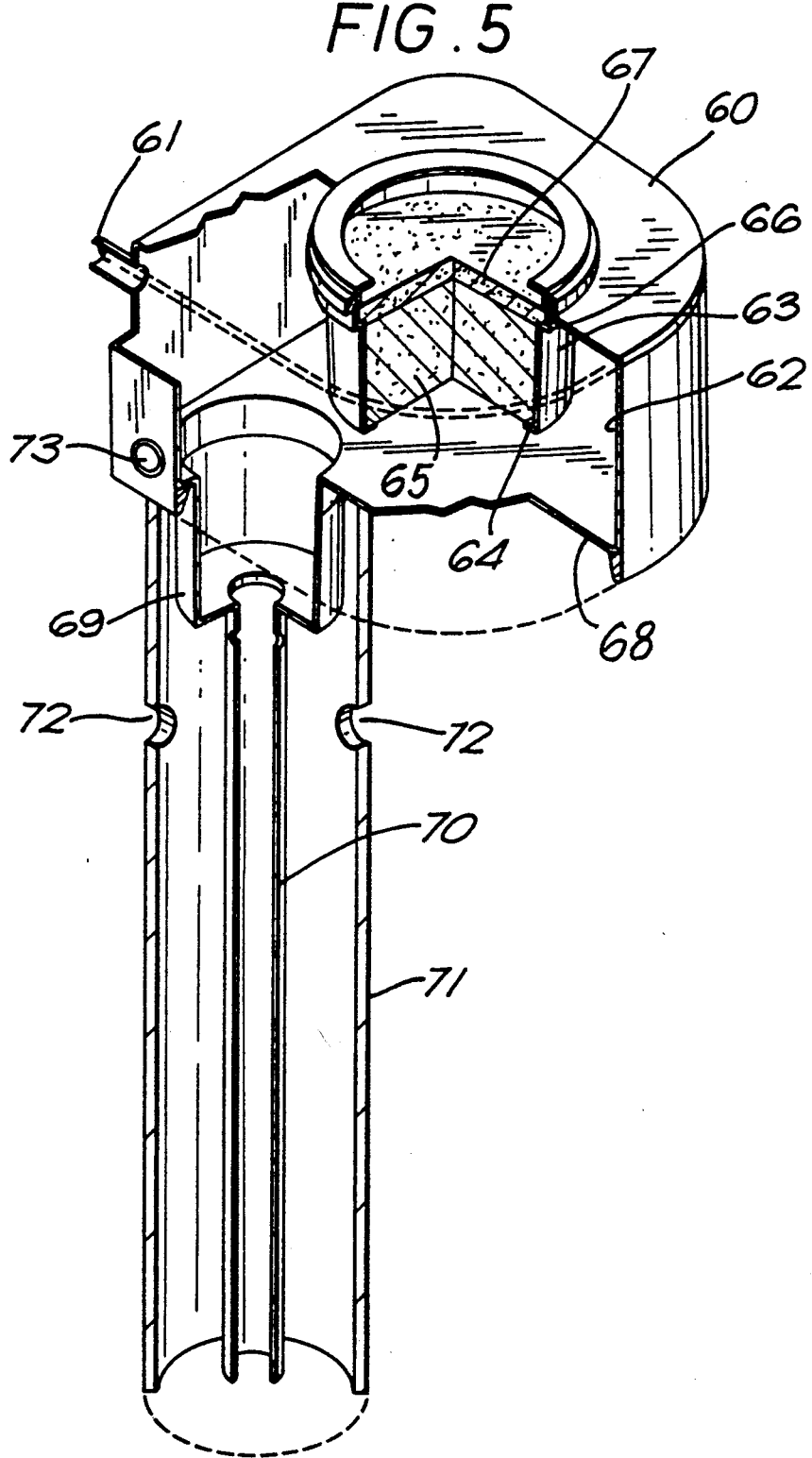

FIG. 5 illustrates a further arrangement of initial separating mean. In this embodiment the inlet manifold 7 is replaced by a gas separation chamber 60 designed to be mounted on top of the container 1. The chamber has an inlet 61 for the incoming air/oil/water mixture, the inlet being directed substantially tangentially towards a curved wall 62 of the chamber. A central annular partition 63 has an inwardly directed lower flange 64 on which rests a first filter 65 and an upper section 66 of greater diameter forming a rim on which rests a second filter 67. The partition 63 may be a separate structure secured within an opening of the chamber 60 or may be molded as an integral part thereof.

The first filter 65 is of such a nature that it is effective to remove any oil/water mist that is present in air passing through the filter out of the chamber and to remove any larger particles, without imposing any significant pressure drop. The second filter 67 should be similarly effective. It may, for example, be a foam pad and it is possible for this to be impregnated with activated carbon in order that any residual oil vapor is adsorbed from the air before discharge to the atmosphere. The lower wall 68 of the chamber 60 opens into a basin 69, from the bottom of which extends an impervious liquid feed tube 70. The chamber 60 is mounted on the container 1 so that the basin 69 and tube 70 extend downwardly within a cylindrical partition 71 having a closed lower end and openings 72 towards its upper end, equivalent to the partition 2a of the embodiment of FIG. 2. If desired, the lower end of tube 70 may open into the interior of a coalescing filter (not shown) similar to the filter 53 indicated in FIG. 2.

In operation, the mixture to be separated enters the chamber and impinges on to the curved wall thereof. The liquids separate from the air on the wall of the chamber and drain into the basin 69 and thus into the separation chamber formed by the interior of cylindrical partition 71. The air leaves the chamber 60 through the filters 65 and 67, any liquid mist being coalesced from the air by these filters and draining into the basin 69. In the separation chamber within partition 71 the oil begins to separate from the water and the liquid rises through the chamber and emerges through the openings 72 into the settlement chamber within the container 1. There the liquids continue separating, contaminant is discharged and the membrane filter 25 and activated carbon filter 37 function as already described. The concentrate from the membrane filter is directed through line 27 which is connected by a port 73 to the chamber 60, in the vicinity of the basin 69 so that the concentrate can flow directly thereto.

This embodiment is advantageous in that entrained air is separated and discharged without entering the space above the liquid in the settlement chamber. No disturbance of that liquid is possible and the apparatus can thus effectively handle higher pressure, higher air volume and irregular inputs.

In any of the embodiments that have been described it is possible to omit the activated carbon filter and to discharge water directly from the molecular separation filter, as long as operating conditions are such that this discharge has an acceptably low contaminant level.

It will be appreciated that the particular arrangement of any form of the apparatus may vary from that shown in the drawings. Using re-entrant sections of the main container to accommodate the activated carbon filter and the contaminant collection tank leads to a particularly compact and elegant design. However, these are not necessary and other arrangements could be used. Similarly mounting of the pump and molecular separation filter on the top of the container allows easy access for maintenance purposes, but these locations are again not essential.

We claim:

1. Apparatus for separating contaminant from water, the contaminant being of lower density than water, comprising a settlement chamber, initial separating means, an entry port for introducing the liquid to be separated into the initial separating means for flow therethrough into the settlement chamber, a contaminant outlet opening from an upper region of the settlement chamber, a pump, a pump intake located towards the lowermost part of the settlement chamber, a molecular separation filter connected to an outlet from the pump and capable of separating water from contaminant, a water outlet from the molecular separation filter, and a contaminant outlet from the molecular separation filter leading into the initial separating means.

2. Apparatus according to claim 1 in which the pump is controlled by a float switch including a float supported by liquid taken from substantially the same level within the settlement chamber as the pump intake, the float switch being operable to switch on the pump at a first float level and to switch off the pump at a second float level below the first level.

3. Apparatus according to claim 2 and including alarm means operable by the float switch should the float reach a third level above the first level.

4. Apparatus according to claim 1 in which the molecular separation filter is a cross-flow membrane filter.

5. Apparatus according to claim 1 in which the water outlet from the separation filter is directed to a sorbent bed through which the water flows before being discharged from the apparatus.

6. Apparatus according to claim 5 in which the sorbent bed is of activated carbon.

7. Apparatus according to claim 1 in which the initial separating means comprises a coalescing filter.

8. Apparatus according to claim 1 in which the initial separating means comprises a gas release region, a separation chamber having an outlet only in an upper part thereof, said outlet opening into the settlement chamber, and an impermeable liquid feed tube extending from the interior of the gas release region to open into the lower part of the separation chamber, said contaminant outlet from the settlement chamber lying above the level of the outlet from the separation chamber and below the level of the gas release region.

9. Apparatus according to claim 8 in which the gas release region comprises a separate chamber isolated within said apparatus.

* * * * *